March 19, 1957    L. R. WAGNER    2,785,713
POWER OPERATED ROTARY END-THRUST CUTTER
Filed March 16, 1954
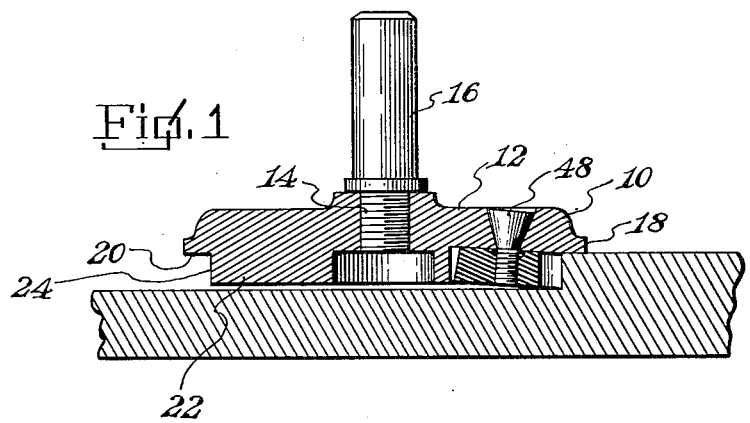
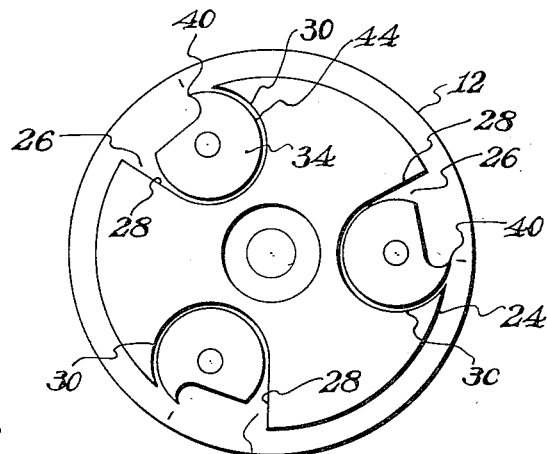
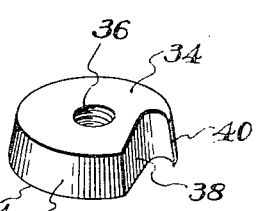
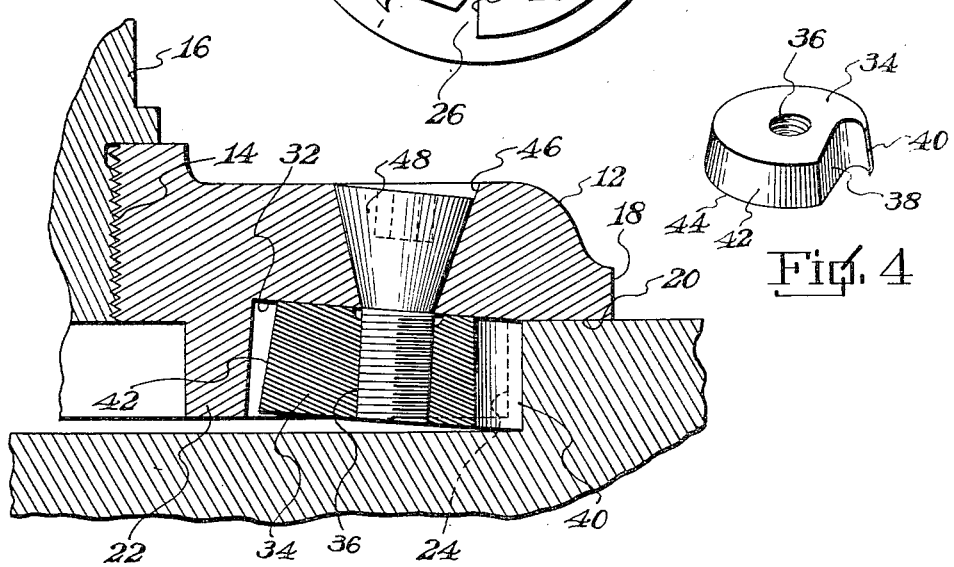

United States Patent Office 2,785,713
Patented Mar. 19, 1957

2,785,713

POWER OPERATED ROTARY END-THRUST CUTTER

Lawrence R. Wagner, Tulsa, Okla., assignor to G & W Tool Company, Tulsa, Okla.

Application March 16, 1954, Serial No. 416,455

3 Claims. (Cl. 144—219)

This invention appertains to improvements in rotary planers used for surfacing wood and plastics and for other wood working operations.

The primary object of this invention is to provide means for mounting cutters in a planer head in such a way as to prevent gouging of the material and to ensure that the cutters advance equally in very small cuts into the material.

Another object of this invention is to provide pockets in a bottom extension of the head in which the cutters are mounted, the cutters being so positioned in the pockets that the major portions of the horizontal cutting edges thereof are above the bottom of the head extension while their vertical cutting edges are arranged in the same circle, which circle lies concentric to the circular side wall of the extension.

A further object of this invention is to provide peripheral pockets or recesses in the bottom extension and to mount the cutters therein in such a way that the circular side wall of the extension bears against the edge of the wood, cut previously by one cutter, and thereby limits the cut of the cutter next in line.

A further object of this invention is to provide conical ground cutters which are mounted in the pockets, that have angular walls against which the tops of the cutters abut, so that the cutters are mounted slightly off horizontal and their vertical cutting edges are thereby disposed perpendicular to the head while the major portions of the horizontal cutting edges lie above the bottom of the extension. Thus, the cutters are housed in a way to protect an operator since they do not project to catch the operator's fingers.

The foregoing and ancillary objects are attained by the invention, the preferred embodiment of which is set forth in the following description and illustrated in the accompanying drawing, wherein:

Fig. 1 is a vertical sectional view of the planer, showing the same in use and working on the surface of a work piece;

Fig. 2 is a bottom plan view of the planer;

Fig. 3 is an enlarged, detail vertical sectional view thereof and showing in detail the mounting of one of the cutters, and, Fig. 4 is a perspective view of one of the cutters.

Referring more particularly to the drawing, the numeral 10 generally designates the planer which includes a bell shaped head 12 that is formed with a central, internally threaded bore 14. The bore threadingly receives the shank 16 by means of which the head is attached to the chuck of a drill press or other power tool. Of course, the head and shank may be cast integral.

A peripheral flange 18 extends radially from the side wall of the head at the bottom thereof and the underside of the flange is normal to the axis of the head to form a bearing shoulder 20 which is at right angles to the axis of the head. Inwardly of the shoulder, a bottom extension 22 is provided on the underside of the head, the extension having an annular peripheral wall 24 which lies substantially below the side wall of the head. The wall 24 is circular and is interrupted by pockets or recesses 26.

The pockets 26 are each formed with substantially straight side walls 28, which are formed radially in the extension 22, and curved side walls 30 which form an acute angle with the side wall 24 of the extension. The side walls 28 form a right angle with the wall 24 and constitute the leading edges of the pockets, while the walls 30 define the trailing edges.

As shown in Fig. 3, the pockets have top walls 32 which slope upwardly from the shoulder 20 and are angularly related thereto.

As illustrated in Fig. 4, the cutters 34 are frusto-conical shaped and have axially extending center bores 36, which are threaded. The cutters are formed with partial tangential cut-outs 38 that terminate in reverted vertical cutting edges 40 that lie at the conical peripheral wall 42. The vertical cutting edges 40, when the cutters are in place, as shown in Fig. 2, lie in a circle that is concentric to the side wall 24 of the extension. The edge 44 provides a horizontal cutting edge on the portion of the base that is disposed radially outwardly of the center thereof.

As shown in Fig. 3, the head is formed with tapered or conical openings 46 which communicate with the centers of the pockets and which receive the conical heads 48 of the screws, the threaded shanks of which are threaded into the bores 36 of the cutters. The screws hold the cutters in an angular set with the tops of the cutters abutting the angular top walls 32 of the pockets. Due to this arrangement, the vertical cutting edges 40 are perpendicular to the head and lie in the circle concentric to the side wall 24 of the extension and the bases of the cutters, inwardly of the wall 24, lie above the bottom of the extension. In other words, the bottom extension extends almost to the radius of the cutters and therefore, the operator is prevented from taking a big gouge out of the surface of the material because the horizontal cut is limited to the difference between the cutter radius and the radius of the bottom extension. Also, the circular side wall 24 of the extension will bear against the edge of the wood, cut by the vertical edge of the previous cutter (see Fig. 1) and will thereby limit the vertical cut of the cutter next in line.

The cutters are positioned in the pockets so that the vertical cutting edges lie in advance slightly of the trailing edges of the pockets, as shown in Fig. 2. The top and bottom faces of the cutters are parallel and the depth of the pockets is substantially equal to the thickness of the cutters, as shown in Fig. 3. The top faces of the cutters are in facial contact with the surfaces 32 that are inclined at a slight angle so that conically ground cutters are cocked at such a degree that the cutting edge is perfectly vertical.

In use, the head can be set in a horizontal position vertically relative to the work piece to cut from the horizontal surface thereof a few thousandths or the full depth. In the full depth cut, shown in Figs. 1 and 3, the shoulder 20 bears on the horizontal surface of the work piece.

While the best known form of this invention has been shown and described, other forms may be realized, as come within the scope of the appended claims.

What is claimed is:

1. A rotary planer comprising a head having a bottom formed with an axial extension, said extension having a circular side wall and having angularly spaced peripherally indented pockets, said pockets having inwardly and upwardly inclined top walls, frusto-conical cutters mounted in said pockets and having their tops flush against the top walls, whereby the cutters are angularly set in the pockets, said cutters having peripheral vertical cutting edges which are disposed vertically of the head by the angular set and which lie in a circle concentric to the circular side wall of the extension and said cutters having base cutting edges which lie inwardly of the vertical cutting edges above the bottom of the extension, said head having an annular peripheral flange just above the extension, said flange having a flat underside disposed normal to the axis of the head and said underside of the flange and the top walls of the pockets being angularly related.

2. A rotary planer comprising a vertically disposed head having a bottom end portion formed with a flat end wall and a circular side wall, said end portion being formed with peripherally indented and circumferentially spaced pockets that extend vertically through the end wall and horizontally through the side wall, each of said pockets having a top wall inclined inwardly and upwardly from the side wall, tapered cutters mounted in the pockets and housed thereby and having upper surfaces in facial contact with the top walls of the pockets so that the cutters are angularly set in the end portion, and said head including an annular peripheral flange extending radially beyond the side wall at the juncture of the end portion and said flange having a flat bottom wall disposed normal to the axis of the head and parallel with the end wall.

3. A rotary planer as claimed in claim 2, wherein said cutters have flat and parallel top and bottom surfaces and have peripheral vertical cutting edges, which are disposed vertically of the head by virtue of their angular mounting in the head and lie in a circle concentric to the side wall and have bottom cutting edges which lie below the end wall only at their outermost portions.

References Cited in the file of this patent

UNITED STATES PATENTS

| | | |
|---|---|---|
| 527,080 | Shimer | Oct. 9, 1894 |
| 581,178 | Shimer | Apr. 20, 1897 |
| 2,214,449 | Berry | Sept. 10, 1940 |

FOREIGN PATENTS

| | | |
|---|---|---|
| 664,738 | Great Britain | Jan. 9, 1952 |